United States Patent [19]
Furukawa et al.

[11] Patent Number: 5,690,406
[45] Date of Patent: Nov. 25, 1997

[54] CONTROL METHOD FOR MICROFILM IMAGE READER

[75] Inventors: Takao Furukawa, Tokyo; Michinori Hashimoto, Kanagawa, both of Japan

[73] Assignee: Fuji Photo Film Co., Ltd., Kanagawa, Japan

[21] Appl. No.: 668,824

[22] Filed: Jun. 24, 1996

[30] Foreign Application Priority Data

Jun. 23, 1995 [JP] Japan ................... 7-179652

[51] Int. Cl.$^6$ .................................. G03B 21/14
[52] U.S. Cl. .................. 353/25; 353/26 A; 353/27 A
[58] Field of Search .......................... 353/25, 26 R, 353/26 A, 27 R, 27 A; 358/452, 453

[56] References Cited

U.S. PATENT DOCUMENTS

| | | | |
|---|---|---|---|
| 4,745,489 | 5/1988 | Kashiwagi et al. | 353/26 A |
| 4,864,149 | 9/1989 | Matsumoto | 353/26 A |
| 5,416,605 | 5/1995 | Hideshima et al. | 353/26 A |

*Primary Examiner*—William Dowling
*Attorney, Agent, or Firm*—Sughrue, Mion, Zinn, Macpeak & Seas, PLLC

[57] ABSTRACT

A control method of a microfilm image reader is provided for reducing the amount of image data to be transferred from a scanner to a host computer, making the transfer time short and hence lengthening the free time of a bus, reducing the storage capacity needed for storing the image data, and simplifying the operation procedure by omitting the process of eliminating the black frame portion when printed out. The host computer supplies the scanner with a window parameter containing a range of reading area, and the scanner detects only an image area from all the reading area to transfer image data of the detected image area to the host computer together with attribute information containing the size of the image area. The attribute information may be managed by a header system, and data on a print position of the target image may be contained in the attribute information.

4 Claims, 7 Drawing Sheets

FIG.7

| BYTE \ BIT | 7 | 6 | 5 | 4 | 3 | 2 | 1 | 0 |
|---|---|---|---|---|---|---|---|---|
| 0 | \multicolumn{8}{l}{WINDOW IDENTIFIER} | | | | | | | |
| 1 | HOLDING | | | | | | | |
| 2~3 | RESOLUTION IN X AXIS | | | | | | | |
| 4~5 | RESOLUTION IN Y AXIS | | | | | | | |
| 6~9 | OFFSET IN UPPER LEFT SECTION OF X AXIS | | | | | | | |
| 10~13 | OFFSET IN UPPER LEFT SECTION OF Y AXIS | | | | | | | |
| 14~17 | WINDOW WIDTH | | | | | | | |
| 18~21 | WINDOW LENGTH | | | | | | | |
| 22 | BRIGHTNESS | | | | | | | |
| 23 | THRESHOLD VALUE | | | | | | | |

CONTROL METHOD FOR MICROFILM IMAGE READER

BACKGROUND OF THE INVENTION

1. Field of the Invention

The present invention relates to a control method for a microfilm image reader, in which a scanner retrieves a target frame specified by a command fed from a host computer, reads an image in the target frame and transfers image data of the read image to the host computer.

2. Prior Art

A typical microfilm image reader includes a host computer and a scanner, in which the scanner retrieves a target frame based on a command in accordance with a SCSI standard (hereinafter, referred as a SCSI command), which is sent from the host computer to the scanner, and reads an image in the target frame to be transferred to the host computer.

The host computer sets a range of a frame containing an image, i.e., sets a range of reading area as a window parameter in the scanner before sending an instruction for image-reading operation to the scanner. Assuming that the range of the frame to be read is set in a range of m×n pixels in the X-Y coordinate system, the scanner will read the image in the range of m×n pixels and transfer image data of the read image to the host computer. The image data is transferred to the host computer together with an attribute information thereof.

The attribute information contains a retrieval key, a format of the image data and the like, which is made into a table in a predetermined form. The attribute information is managed by either a header system or a directory system. The header system is used to store, in the same memory location or memory area, the image data and the attribute information thereof that is considered as a portion of the image data, and to transfer the image data and the attribute information. The directory system is used to file the attribute information individually so that the attribute information of the image data can be memorized and managed separately from the image data.

Each frame recorded on a microfilm includes an original image of a document and a black frame portion surrounding the image. When developing or printing a negative film into a positive, there exists an area of a black frame portion (hereinafter, also referred simply as a black frame) surrounding the original image. Since reading of the black frame is not required, a conventional system generally performs preliminary scanning throughout the full range of the image (reading area range) to detect the black frame before performing real scanning of a true or actual image area except the black frame so that only the image in the actual image area can be read and transferred to the host computer.

FIG. 9 is a simplified diagram showing a conventional system for transferring image data. In FIG. 9, a reference numeral 1 denotes the full range of the image to be read, i.e., the reading range in the size of m×n pixels. The size (m×n) is set by the host computer as a window parameter in the scanner prior to the scanning operation. A reference numeral 2 denotes a true or actual image area, i.e., an original image of a document with the size of M×N pixels. Surrounding the image area 2 is a black frame 3.

When the actual image area 2 is read by the scanner, the image data of the image area 2 is transferred to the host computer together with its attribute information. Since the attribute information used herein contains data on the size of the reading area range 1 of a frame corresponding to m×n pixels, a memory such as a buffer memory in the scanner has to reserve a storage capacity for an area of m×n pixels.

The image data is transferred as data of m×n pixel size by adding white area data subsequent to the image data of the actual image area 2 corresponding to M×N pixel size. The host computer thus memorizes the image data, as shown in FIG. 9, such that the corner of the actual image area 2A is shifted to the zero point of the full reading range 1A of a frame, and the remaining area is made white or blank.

In such a conventional image data transfer system, although the actual image area 2A is smaller than the area (reading area range) 1A set with the window parameter, the image data of the same m×n size as the area 1A is transferred by applying the white area data to all the area (corresponding to the black frame 3) other than the actual image area 2A.

The unnecessary white area data is thus transferred to the host computer, and this results in an increase of transfer time, thereby reducing the free time of a bus (SCSI interface) which provides communication between the host computer and the scanner. Another problem also arises that a large storage capacity of the host computer is required for storing such image data. Further, since the image data fed in the host computer contains data of the white area to which the black frame was converted, the white area data corresponding to the black frame must be eliminated when supplying the image data to an output device such as printer.

SUMMARY OF THE INVENTION

An object of the present invention is to provide a control method for a microfilm image reader, in which the amount of image data to be transferred from a scanner to a host computer can be reduced to make the transfer time short and hence, lengthen the free time of a bus (bus free). The storage capacity of the scanner as well as the host computer needed for storing the image data can be reduced, and the operation procedure can be simplified by omitting the process of eliminating the black frame portion required when printed out.

The object of the present invention is attained by the provision of a control method for a microfilm image reader, in which a scanner with a line sensor reads an image in a retrieved frame specified by a command fed from a host computer and transfers image data of the read image to the host computer, comprising the steps of:

outputting a window parameter containing a range of reading area from said host computer to said scanner;

detecting by said scanner only an image area from all the reading area specified by the window parameter; and transferring image data of the detected image area from said scanner to said host computer together with attribute information containing the size of the image area.

The attribute information may be managed by a header system, and data indicating a print position of the target image may be contained in the attribute information.

BRIEF DESCRIPTION OF THE DRAWINGS

The above and other objects and advantages and further description will now be discussed in connection with the drawings, in which:

FIG. 7 is a diagram showing a structure of a window parameter;

DETAILED DESCRIPTION OF THE PREFERRED EMBODIMENTS

Figure 1:
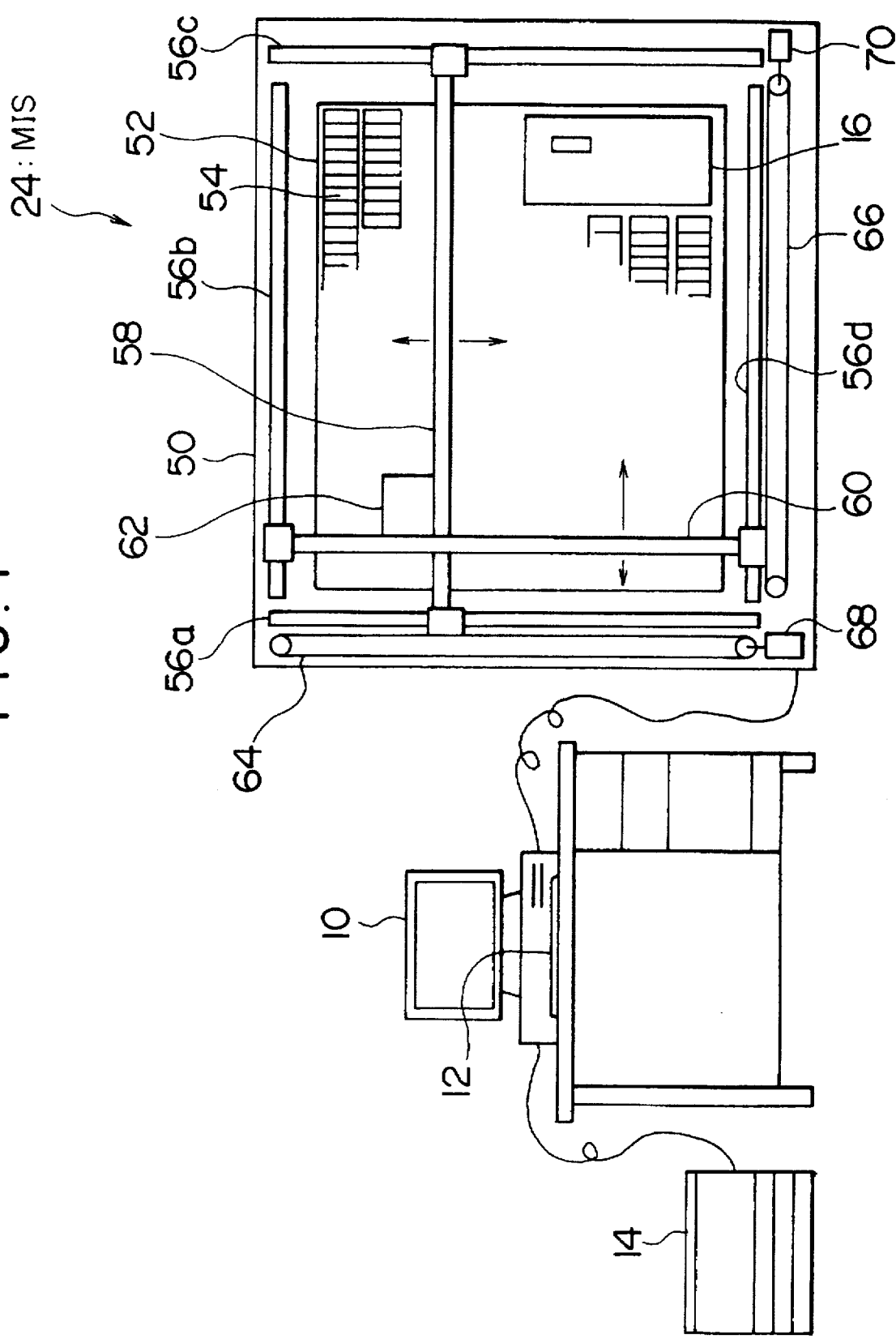
FIG. 1 is a schematic diagram showing a microfilm image reader system to which an embodiment of the present invention is applied.
Figure 2:
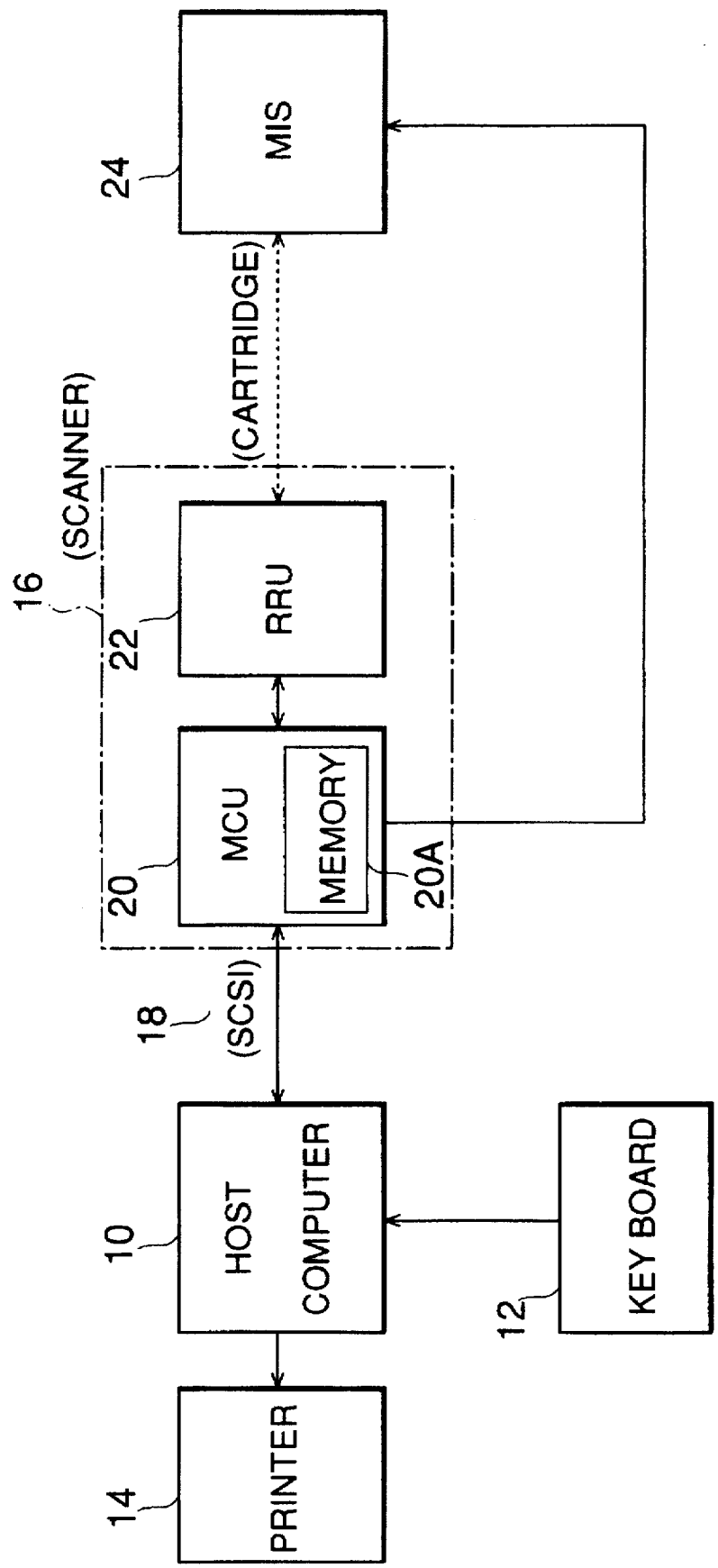
FIG. 2 is a block diagram showing a general structure of the system in FIG. 1.

Referring to FIGS. 1 and 2, a reference numeral 10 denotes a host computer, which may be a personal computer or a work station. A key board 12 and a printer 14 are connected to the host computer 10. Reference numeral 16 designates a scanner for retrieving a target frame recorded on a microfilm and reading (scanning) an image in the target frame. The scanner 16 is placed inside a MIS (Microfilm Install Unit) 24 described later.

The scanner 16 is then connected to the host computer 10 through a bus (BUS) 18 in accordance with a SCSI standard. That is, the connection between the host computer 10 and scanner 16 is established by a SCSI interface. The scanner 16 includes a microfilm control unit (hereinafter, also referred as MCU in this specification and appended drawings) 20 and a roll-film retrieval unit (hereinafter, also referred as RRU) 22.

The MCU 20 is provided with a microcomputer for controlling retrieval operation of the RRU 22 as well as for reading an image in a retrieved frame while moving a line sensor and storing image data of the read image in a memory 20A such as a DRAM. The RRU 22 retrieves a desired frame while feeding a roll of microfilm.

The microfilm install unit (MIS) 24 stores a large number of microfilm cartridges and selects a desired cartridge to load the RRU 22 of the scanner 16. When the MCU 20 has specified a cartridge containing a target frame to be retrieved, if the cartridge is not being loaded into the RRU 22, the MIS 24 will operate to replace a cartridge currently loaded in the RRU 22 by the cartridge containing the target frame.

The MIS 24 has a rectangle case 50, and cartridge shelves 52 are provided inside the case 50 for storing a large number of microfilm cartridges 54 so that a desired cartridge can be slid in or out from the front of the corresponding shelf 52. On the front face of the case 50, guide rails 56 (56a, 56b, 56c, 56d) are fixed along the four sides. A horizontal rail 58 is guided along the opposite two guide rails 56a, 56c to move up and down, whereas a vertical rail 60 is guided along the opposite two guide rails 56b, 56d to move sideways.

The horizontal rail 58 and the vertical rail 60 move in vertical and lateral directions, respectively, at right angles to each other, and a cartridge carrier 62 is slidably attached to the rails 58, 60 at the intersection of the two rails 58, 60. The horizontal rail 58 is fixed to a belt 64 tightly wound around a pair of pulleys located near both ends of the guide rail 56a, whereas the vertical rail 60 is fixed to a belt 66 tightly wound around a pair of pulleys located near both ends of the guide rail 56d. The belts 64, 66 are moved and positioned by motors 68, 70, respectively, each motor 68, 70 being coupled to a corresponding pulley.

Thus, the horizontal rail 58 and the vertical rail 60 are moved individually by the motors 68 and 70, so that the cartridge carrier 62 can be shifted to a proper position. The cartridge shelves 52 and the scanner 16 are located within a movable range of the cartridge carrier 62. For example, the scanner 16 is placed in the right corner of the lower portion within the movable range of the cartridge carrier 62.

The cartridge carrier 62 picks up a desired cartridge 54 from a cartridge shelf 52 and carries it to the scanner 16. After the retrieval and reading operation, the cartridge carrier 62 receives a currently loaded cartridge from the scanner 16 at the end of the retrieval and returns it to a predetermined position on the corresponding cartridge shelf 52.

Figure 3:
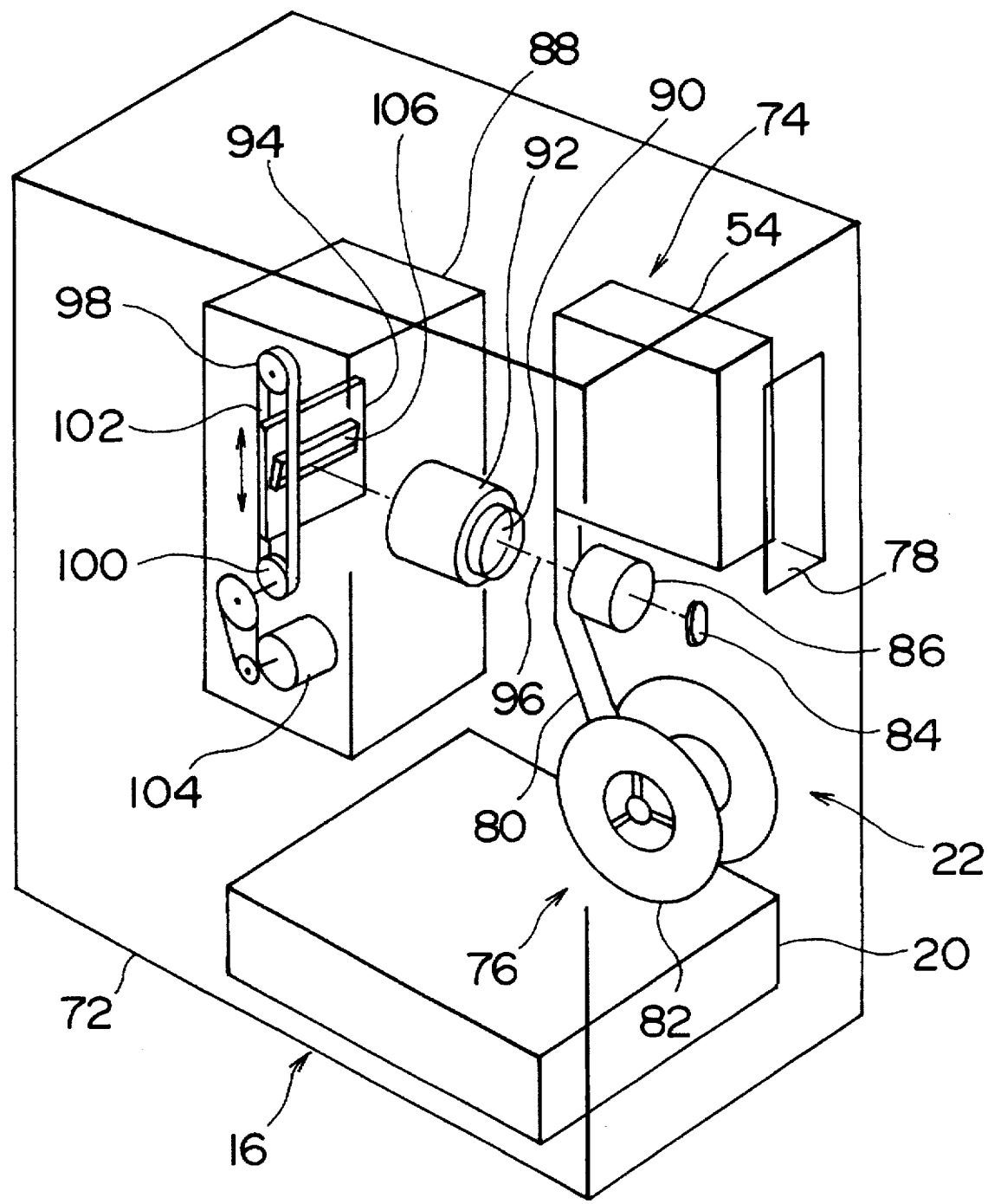
FIG. 3 is a perspective view illustrating an inner arrangement of a scanner used in the system in FIG. 1.

Referring next to FIG. 3, an inner arrangement of the scanner 16 will be described. The scanner 16 includes the MCU 20 and the RRU 22 as mentioned above. The scanner 16 has a longitudinal cabinet 72, and the MCU 20 and the RRU 22 are provided inside the cabinet 72. The MCU 20 is constituted with a microcomputer and mounted on the bottom of the cabinet 72. Hereinbelow, a description will be made of the RRU (roll-film retrieval unit) 22.

In the cabinet 72, a feed reel driving unit 74 and a take-up reel driving unit 76 are arranged in the upper front portion and lower front portion, respectively. When a cartridge 54 is inserted into a cartridge loading port 78, the feed reel driving unit 74 automatically moves the cartridge 54 and engages a feed reel with a rotating shaft of the feed reel driving unit. Then, the feed reel driving unit 74 pulls out a head lead of a roll film 80 loaded in the cartridge 54 and feeds it downwardly to guide it to a take-up reel 82 in the take-up reel driving unit 76.

When viewing the scanner 16 in FIG. 3, the film 80 passes through the back side of the empty space between the respective reel driving units 74, 76, that is, the film 80 passes through at the inner backside as viewed from the front of the cabinet 72, so that light source lamp 84 and condenser lens 86 can be arranged in a space formed by a gap between the reel-to-reel distance and the front panel of the cabinet 72.

In the cabinet 72, a line sensor unit 88 is also provided for reading a projected image in a target frame by a line sensor. The line sensor unit 88 is integrated with a projection lens 90. More specifically, a cylindrical section 92 for holding the projection lens 90 is integrally formed with the case of the line sensor unit 88. The projection lens 90 mounted in the cylindrical section 92 is a fixed focus lens with a magnifying power of approximately 2.

In the case of the line sensor unit 88, a movable plate 94 is provided on the side opposite to the cylindrical section 92. The movable plate 94 is slidably mounted along with a pair of guide rods (not shown) fixed to the case, so that the movable plate 94 can reciprocate along a plane perpendicular to an optical axis 96 and around the opening of the cylindrical section 92.

Further, a belt 102 wound around pulleys 98, 100 is provided inside the case in a position parallel to the reciprocating direction of the movable plate 94, and one side of the movable plate 94 is fixed to the belt 102. The belt 102 is driven by a stepping motor 104 through the pulley 100. Thus, the movable plate 94 can be reciprocated on a plane perpendicular to the optical axis 96 by rotating the stepping motor 104 in a forward or reverse direction.

A CCD arrayed line sensor 106 is fixed on the movable plate 94 in a direction perpendicular to the reciprocating direction of the movable plate 94. It should be noted that the light-receiving surface of the CCD line sensor 106 must correspond to a plane on which a projected image from the projection lens 90 is focused.

The RRU (roll-film retrieval unit)22 is also provided with a blip mark detection means (not shown) for detecting blip marks previously marked on each frame of the film 80 as key points of the retrieval. The blip marks are counted by a light-emitting element and a light-receiving element arranged to provide a light path through the film 80.

The MCU (microfilm control unit) 20 thus controls the RRU 22 to search or retrieve a target frame in accordance with the counted blip marks corresponding to the target frame.

Figure 9:
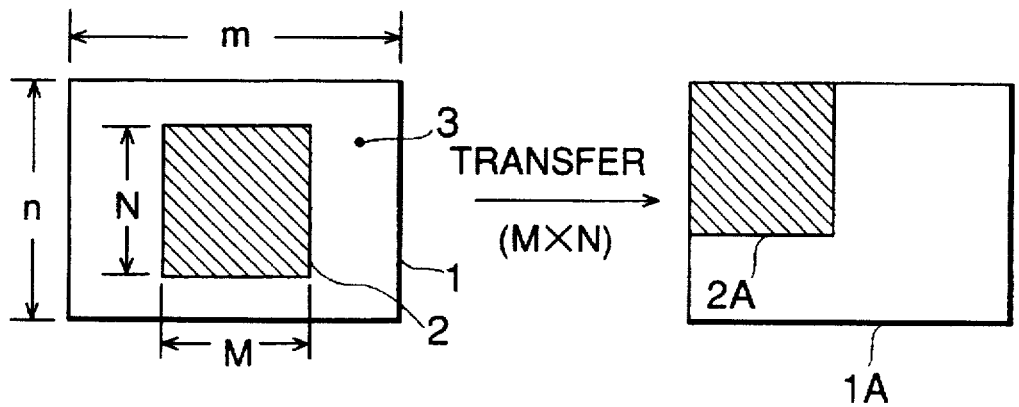
FIG. 9 is a simplified diagram showing a conventional system for transferring image data from a scanner to a host computer.

The host computer 10 outputs a "SET WINDOW" command through the bus 18 to the MCU 20 to set a window parameter (step 200 in FIG. 6) in the MCU 20. The window parameter consists of set items as shown in FIG. 7, i.e., a window identifier, the resolution or the numbers of pixels in X and Y axes, offset amounts in upper left sections of X and Y axes or the zero point, a window width or a reading range of a frame (corresponding to area 1 or 1A in FIGS. 9 or 5), brightness, a threshold value, etc.

The MCU 20 executes predetermined processings such as to reserve a storage area in the memory 20A on the basis of the parameter. After end operation of such processings, the MCU 20 sends a complete signal through the bus 18 back to the host computer (step 202 in FIG. 6), and the host computer then outputs a "SCAN" command to the MCU 20 (step 204).

The "SCAN" command contains an address of a target frame to be retrieved. The MCU 20 starts retrieving the target frame immediately after receiving the "SCAN" command (step 206). The RRU 22 is operated to select the target frame from the microfilm while feeding the film. When no target frame is recorded on the microfilm in the cartridge currently loaded in the RRU 22, the MCU 20 sends a signal to the MIS 24 to replace the cartridge by another one containing the target image (step 208). The cartridge is replaced by a new one after the film is rewound into the cartridge.

Figure 4:
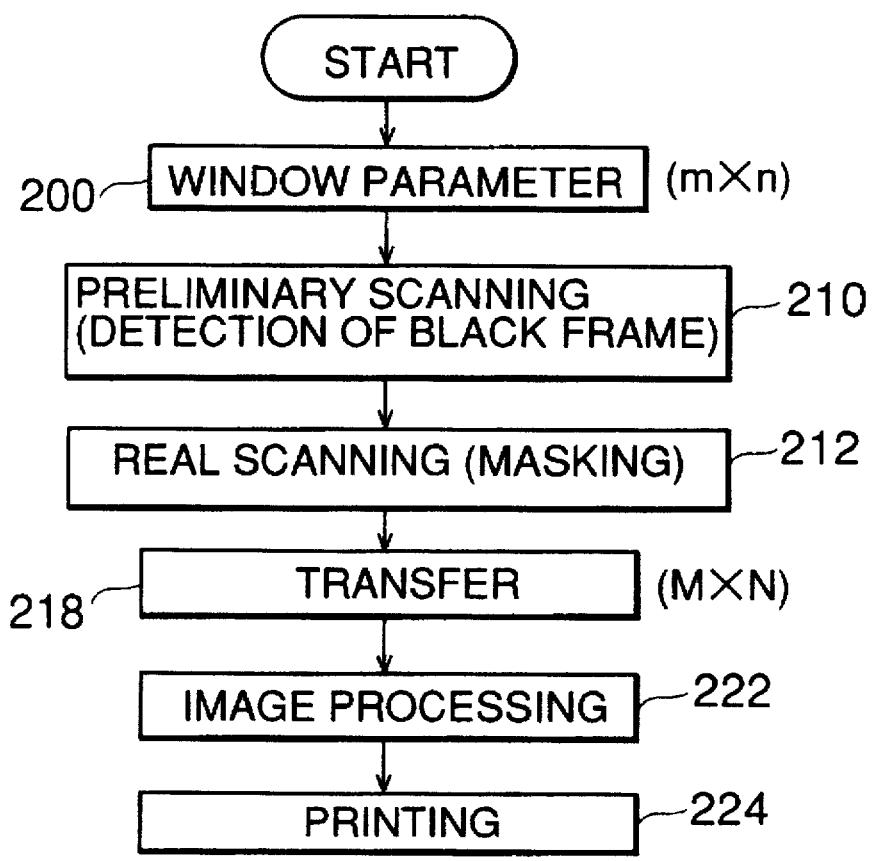
FIG. 4 is a flowchart showing operation of the embodiment.
Figure 5:
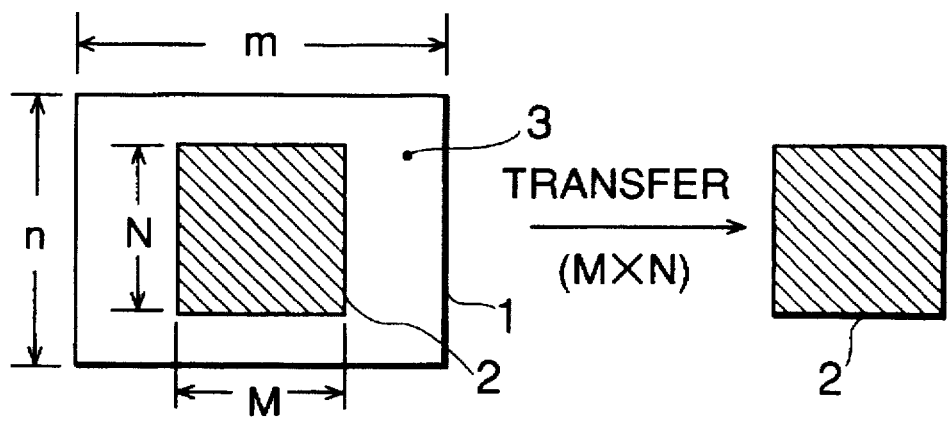
FIG. 5 is a simplified diagram showing an image data transfer system of the embodiment according to the present invention.
Figure 6:
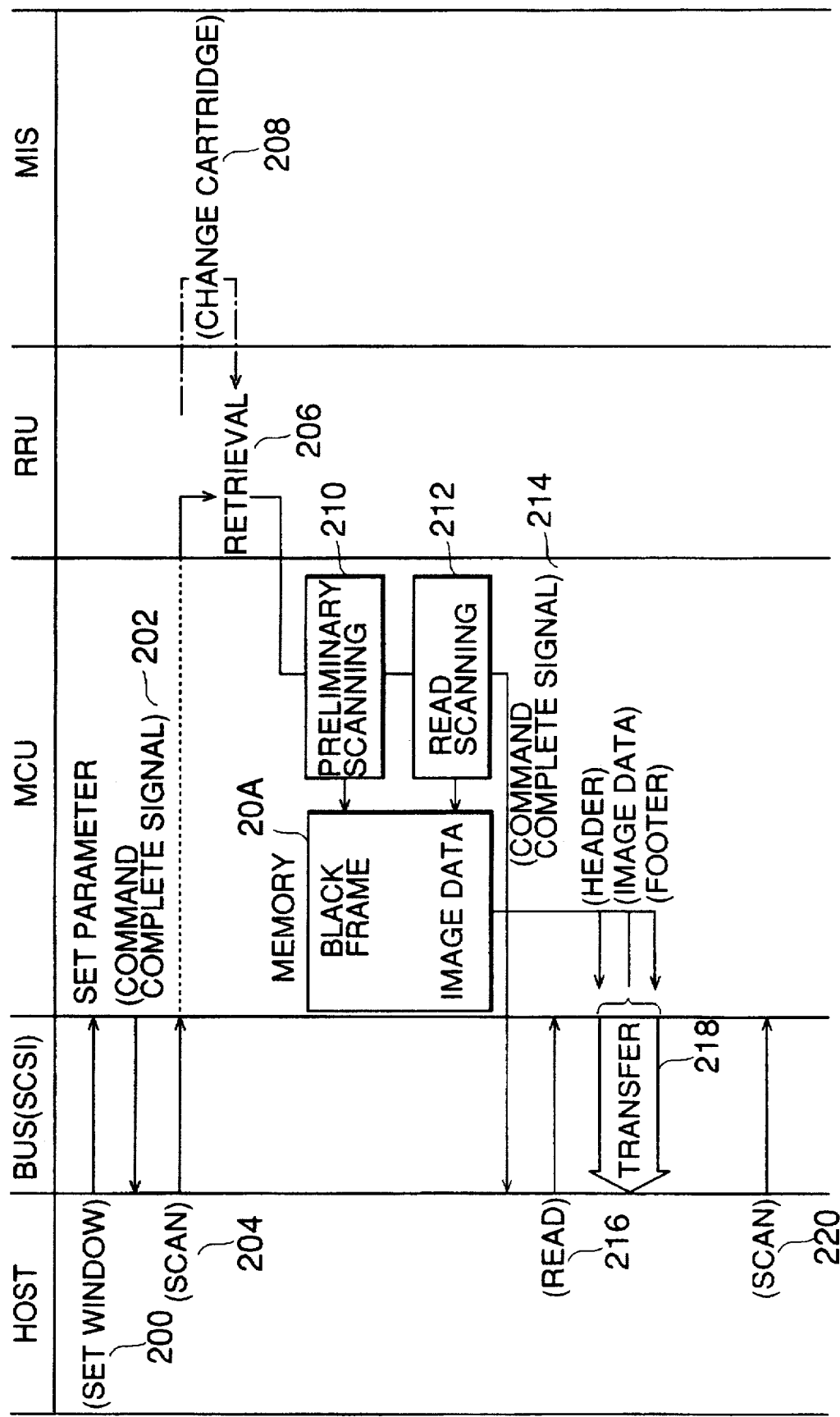
FIG. 6 is a schematic diagram explaining operation procedure of the embodiment.

After the target frame is found, the MCU 20 reads the full reading range of a frame specified by the window parameter and detects the black frame 3 (preliminary scanning at step 210 in FIGS. 4 and 6; also see FIG. 5). Coordinate data of the black frame 3 is input to the memory 20A and written as attribute information in a header HD or footer FT shown in FIG. 8.

Figure 8:
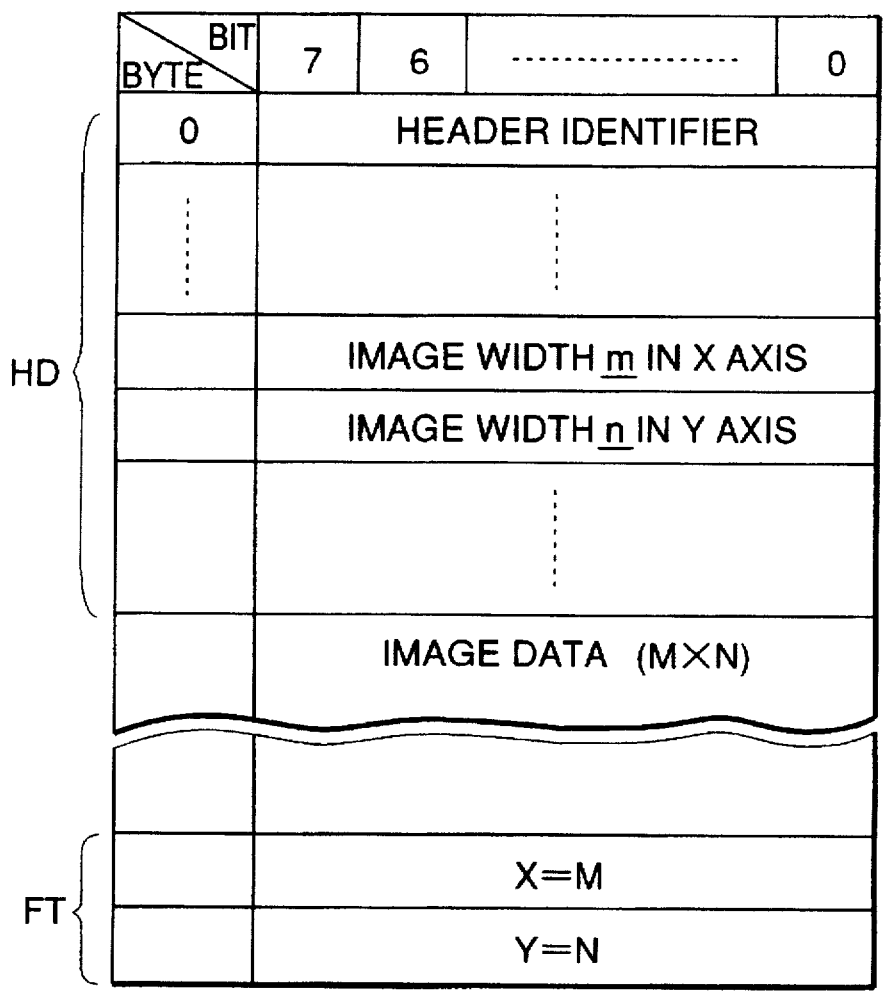
FIG. 8 is a diagram showing a header structure of image data.

As shown in FIG. 8, the header HD contains a header identifier, image widths m and n in the X and Y axes, and other attribute information. In the embodiment, the footer FT is provided after the image data, in which data of the black frame 3, i.e., data on the size of the actual image area 2 corresponding to M×N pixels is written. It should be noted that the data on the size of the actual image area 2 corresponding to M×N pixels may be written in the header HD.

The MCU 20 then moves the line sensor again and reads an image in the actual image area 2 to memorize image data of the read image sequentially in the memory 20A (real scanning at step 212 in FIGS. 4 and 6). The image in the actual image area 2 is read by masking or eliminating the black frame portion 3. When the image has been completely read after end operation of the scanning, the MCU 20 sends a command complete signal through the bus 18 to the host computer 10 (step 214 in FIG. 6).

The host computer 10 then outputs a "READ" command upon receipt of the command complete signal (step 216 in FIG. 6). The MCU 20 receives the "READ" command and transfers the header HD, the image data of the image area 2 and the footer FT from the memory 20A to the host computer 10 (step 218 in FIGS. 4 and 6). After end operation of the data transfer, the MCU 20 sends the command complete signal to the host computer so that the host computer 10 can start retrieving the next target frame (step 220 in FIG. 6).

By repeating the above-described operation procedure, a large number of frames are sequentially retrieved, images in the respective retrieved frames are read and the image data of the respective read images are transferred to the host computer 10. Finally, the host computer 10 processes the image data in predetermined image processings (step 222 in FIG. 4) and supplies the processed data to a printer 14 (step 224 in FIG. 4). The image data may be transferred to other computer or a storage medium such as a magneto-optical disk.

In this embodiment, the size of the image data of the actual image area 2 is M×N pixels. The image data is transferred to the host computer 10 together with the header HD and the footer FT as one data group by adding the header HD and the footer FT before and after the image data. Since there is no need to rewrite the black frame portion 3 (see FIG. 5) into a white area data and to transfer the rewritten data to the host computer 10, the amount of transfer data can be reduced, resulting in short occupation time of the data bus 18 when the data is transferred.

In the header system, the image size of M×N pixels is included in either the header HD or the footer FT. In contrast, in a directory system, the size data may be contained in a file of the attribute information to be transferred to the host computer 10 separately from the image data of the read image. The present invention can be applied to such a case as used in the directory system.

In the embodiment, although the attribute information on the data size of the actual image area 2 (corresponding to M×N pixels) is transferred to the host computer 10 together with the image data of the actual image area 2, other data attributes may be set as attribute information together with or instead of the attribute information on the size of the actual image area. The following are examples of data attributes that can be set as attribute information.

The first example sets a printing position in which the image data of the true image area 2 is printed out (information of the image output position). By setting such information, the image in the true image area 2 can be printed out in a correct or true position of a print paper.

The second example sets a strength parameter of a mask as attribute information, the strength parameter required when an unsharped mask method is used for an edge-emphasizing processing.

In the third example, a curve parameter of a look-up table for controlling tone representation of the image is set as an attribute information. In the look-up table, the pixel tone or density (input) is set for a horizontal axis and the transformed pixel tone or density (output) is set for a vertical axis so that a transformation characteristic between the tones can be determined. The curve parameter is used to describe a curve of the transformation characteristic.

The fourth example sets a size parameter of a mask as attribute information. The mask size is used to determine a decision area required when the image is processed by a spacial filtering.

The fifth example sets a density range parameter as attribute information. By the density range parameter, a part of a read image within a predetermined density range, which is set in a high density side and/or a low density side, is converted to a constant density level.

The sixth example sets a dither pattern parameter as attribute information, for binarizing multi-tone or multi-leveled gradation image data of the read image using a dither method.

The seventh example sets a slice level (threshold value) for binarization as attribute information, the slice level used for binarizing processing an image which is photographed in an automatic exposure (AE) control photometry for automatically measuring the light exposure of an image to be photographed and automatically controlling the intensity of light exposing the image. In the case the AE photometry is used, since the exposure density remarkably varies depending on the type of a document containing a target image, such as a map or an old document, it is necessary to greatly change the slice level for binarizing multi-valued density or half-tone data of the read image. Thus, the parameter needs setting for changing the slice level in accordance with the exposure density.

As described above, according to the present invention, the scanner detects the black frame portion of an image and transfers image data for all the area except of the black frame portion, i.e., transfers image data of the actual image area to the host computer together with attribute information containing the data size of the actual image area, so that the amount of data to be transferred can be reduced, resulting in short transfer time. Accordingly, occupation time of the bus required during the data transfer is also reduced, and this is convenient for transferring other data through the same bus.

Since the amount of image data to be stored in the memory of the scanner as well as the host computer is also reduced, the storage capacity to be allocated to the image data can be reduced. Further, the host computer is not required to perform image processing to eliminate the black frame portion from the entire image data to be transferred from the scanner to the host computer, so that the operation procedure can be simplified.

What is claimed is:

1. A control method for a microfilm image reader, in which a scanner with a line sensor reads an image in a retrieved frame specified by a command fed from a host computer and transfers image data of the read image to the host computer, comprising the steps of:

outputting a window parameter containing a range of reading area from said host computer to said scanner;

detecting by said scanner only an image area from all the reading area specified by the window parameter; and transferring image data of the detected image area from said scanner to said host computer together with attribute information containing the size of the image area.

2. The method according to claim 1, wherein the attribute information is managed by a header system, in which the attribute information is stored as portion of the image data in the same memory location as the image data and transferred together with the image data.

3. The method according to claim 1, wherein the attribute information contains a print position of the image to be printed out.

4. The method according to claim 2, wherein the attribute information contains a print position of the image to be printed out.

* * * * *